(12) United States Patent
Hansen et al.

(10) Patent No.: US 9,863,554 B2
(45) Date of Patent: Jan. 9, 2018

(54) SUBSEA POSITION CONTROL SYSTEM FOR ELONGATE ARTICLES

(71) Applicant: Subsea 7 Norway AS, Stavanger (NO)

(72) Inventors: Jan Henry Hansen, Stavanger (NO); Eskil Hoyvik, Stavanger (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 15/018,735

(22) Filed: Feb. 8, 2016

(65) Prior Publication Data

US 2016/0153585 A1  Jun. 2, 2016

Related U.S. Application Data

(62) Division of application No. 13/700,661, filed as application No. PCT/EP2011/058511 on May 24, 2011.

(30) Foreign Application Priority Data

May 28, 2010  (GB) .................................. 1009044.7

(51) Int. Cl.
| | | |
|---|---|---|
| *F16L 1/235* | (2006.01) | |
| *F16L 1/12* | (2006.01) | |
| *F16L 1/20* | (2006.01) | |
| *B63C 11/52* | (2006.01) | |

(52) U.S. Cl.
CPC .............. *F16L 1/235* (2013.01); *B63C 11/52* (2013.01); *F16L 1/12* (2013.01); *F16L 1/20* (2013.01)

(58) Field of Classification Search
CPC .... B63B 35/03; F16L 1/12; F16L 1/16; F16L 1/20

USPC ..... 114/313; 405/154.1, 158, 160, 164, 165, 405/166, 172

See application file for complete search history.

(56) References Cited

U.S. PATENT DOCUMENTS

| | | | |
|---|---|---|---|
| 3,559,413 A | | 2/1971 | Silverman |
| 3,765,185 A | | 10/1973 | Peck et al. |
| 3,844,129 A | | 10/1974 | Finlay |
| 4,127,006 A | | 11/1978 | Oosterkamp |
| 4,183,697 A | | 1/1980 | Lamy |
| 4,537,530 A | * | 8/1985 | Yamamura ............... E02F 5/105 405/160 |
| 4,933,917 A | | 6/1990 | Bruneval |
| 5,074,712 A | | 12/1991 | Baugh |
| 5,280,138 A | | 1/1994 | Preston et al. |
| 5,575,590 A | | 11/1996 | Drost |

(Continued)

FOREIGN PATENT DOCUMENTS

| | | |
|---|---|---|
| EP | 0 431 279 | 6/1991 |
| EP | 0 883 009 | 12/1998 |
| WO | WO 99/01689 | 1/1999 |

*Primary Examiner* — Lars A Olson
(74) *Attorney, Agent, or Firm* — Levy & Grandinetti

(57) ABSTRACT

A method of controlling subsea laying of an elongate article includes guiding the article using a submersible vehicle such as an ROV that carries a guide tool. The guide tool has a sleeve through which the article moves axially during laying, while the vehicle applies cross-axial guide forces to the article via the sleeve. Also disclosed is a guide tool including a sleeve through which the article can move axially during laying, and a grab handle whereby a submersible vehicle may hold the tool using a grabber. Alternatively, the guide tool can be attached to or integrated with the vehicle.

24 Claims, 10 Drawing Sheets

(56) References Cited

U.S. PATENT DOCUMENTS

| | | |
|---|---|---|
| 6,971,413 B2 | 12/2005 | Taylor et al. |
| 6,994,492 B2 | 2/2006 | McMillan et al. |
| 8,297,883 B2 | 10/2012 | Masters et al. |
| 2004/0079271 A1 | 4/2004 | Charnock et al. |
| 2007/0296229 A1 | 12/2007 | Chauvin et al. |
| 2012/0207547 A1 | 8/2012 | Guzick et al. |
| 2012/0275864 A1* | 11/2012 | Valade ................... B63G 8/001 405/154.1 |

* cited by examiner

SUBSEA POSITION CONTROL SYSTEM FOR ELONGATE ARTICLES

This application is a divisional application of U.S. application Ser. No. 13/700,661, filed on Nov. 28, 2012, which is the U.S. National Phase of International Application Number PCT/EP2011/058511 filed on May 24, 2011, which claims priority to Great Britain Application Number 1009044.7 filed on May 28, 2010.

This invention relates to controlling the position of elongate articles underwater, in particular pipelines, umbilicals, power lines and the like when being laid for use by the oil and gas industry and the renewable energy industry.

Positioning lightweight, elongate articles such as flexible or rigid pipelines, power lines and umbilicals is challenging, especially in deepwater areas with strong subsea currents. Such articles can be moved around unexpectedly by the current and by surface swells and this can affect the lay positioning. More generally, there may be problems in maintaining a desired catenary shape within the prescribed installation limits. Problems may arise in the following areas in particular over-bending and compression in the touchdown area;
inadvertent contact between the catenary and the installation vessel, for example the edges of a moon pool of the vessel;
excessive tension in the touchdown area;
excessive departure angle for the lay system in question, for example when going through a 'tulip'; and
keeping within a lay corridor, especially when visibility is poor due to sediment in the water.

These problems are most often present when a lightweight article is to be installed at a deepwater location with strong currents. Of course, 'lightweight' is a relative term and must be interpreted in the context of the invention. For example, an umbilical may be over 100 km long and weigh over 2000 tonnes in total. However it will be appreciated that a length of umbilical or similar product hanging as a catenary between the surface and seabed will be sufficiently flexible and light that it may be adversely influenced by subsea currents.

The abovementioned problems may be mitigated to some extent by using a depressor unit at a mid-water position, which acts as a pendulum weight and guide whose inertia and positioning helps to control the position of the article. The structure and operation of a depressor unit will now be described with reference to FIGS. 1(a) and 1(b) of the drawings. In those drawings:

FIG. 1(a) is a perspective view that shows a depressor unit in use when laying an umbilical; and FIG. 1(b) is a perspective view that shows the depressor unit of FIG. 1(a) in isolation.

The depressor unit 10 shown in FIGS. 1(a) and 1(b) comprises a tube 12 with flared opposed ends that is placed around the umbilical 14 like a sleeve and submerged. The umbilical 14 slides through the tube 12 when being laid on the seabed 16. The tube is supported and protected by a surrounding cage-like frame 18. One or more wires 20 are attached to the frame 18 whereby a support vessel on the surface (not shown) can control the depth and position of the unit 10. The whole unit 10 weighs approximately two tonnes. The weight of the unit 10 influences the bend shape of the umbilical 14 and the position and depth of the unit 10 are selected to move the touchdown point 22 as required.

Depressor units such as that shown in FIGS. 1(a) and 1(b) have been used with reasonable success by various contractors in deepwater locations, notably the Ormen Lange gas field off Norway. However, a depressor unit is a passive device that will itself be moved by the current, and its response time and unpredictable reaction to changing currents make it difficult to control. The unit is also difficult to handle as it is bulky and heavy and is supported by wires.

It is against this background that the present invention has been made. The basis of the invention is to use an ROV-controlled guide tool to assist in controlling the catenary when laying pipelines and umbilicals. The invention involves an ROV interface tool and also systems and methods used to control the tool position with the ROV. ROVs have been used previously for touchdown monitoring; however, the invention is concerned with controlling touchdown using an ROV rather than merely monitoring touchdown.

WO 99/01689 to Seateam discloses a touchdown monitoring system that is movably coupled to a pipeline and is also coupled to an installation vessel by a cable. A cylindrical portion with an internal bore receives the pipeline but there is no provision for holding the sleeve with an ROV or applying guiding forces via the ROV. An ROV is mentioned, but only in a monitoring capacity and it does not apply guide forces to the pipeline.

EP 0883009 to Alcatel discloses a guide-weight that is suspended from an installation vessel and rides on an elongate article such as a cable during laying. An ROV is flexibly coupled to the guide-weight, but again it only monitors touchdown and does not apply guide forces to the cable.

EP 0431279 to Alcatel discloses a cable guiding device that is suspended from an installation vessel and rides on an elongate article such as a cable during laying. The device comprises a pipe that receives the cable. A rudder and propeller may be provided on the device to position the cable actively on the seabed. However the cable guiding device cannot be operated by an ROV; also, the cable must be threaded through the cable guiding device to mount the cable guiding device on the cable.

U.S. Pat. No. 3,765,185 to Aqua Systems discloses the idea of controlling the contour of a pipeline during laying using submersible vehicles. A series of submersible vehicles are clamped to the pipeline. Whilst a mechanism is shown for actively 'walking' the clamped vehicles along the pipeline to avoid the vehicles colliding with the seabed as the pipeline touches down, the vehicles do not applying guiding forces while the pipeline moves relative to the vehicles.

U.S. Pat. No. 4,933,917 to Bruneval discloses apparatus that monitors—rather than controls—the laying of a cable or flexible pipeline. The apparatus comprises a sleeve through which the cable or pipeline runs during laying, and is passive in terms of positioning.

U.S. Pat. No. 4,183,897 to Lamy discloses an arrangement of floats that controls the laying of a cable or flexible pipeline. The buoyancy of the floats can be adjusted to apply cross-axial (i.e. upward or downward) forces to the cable or pipeline but the floats cannot apply other guidance forces during laying.

The present invention has two aspects. One aspect involves a guide tool with which an ROV may control the bend shape of the catenary for better control than is offered by existing depressor units or other prior art. The other aspect involves an enhanced ROV positioning technique that may be used to move the guide tool automatically along the lay route. Both aspects aim to improve the lay accuracy, preferably while also increasing the lay speed.

In principle, it would be possible in accordance with the invention to perform the role of an ROV using an autonomous underwater vehicle or AUV. In a broader generic sense, therefore, the invention involves the use of a submersible vehicle to guide the article being laid.

From the first aspect, therefore, the invention resides in a guide tool usable for subsea laying of an elongate article by a submersible vehicle, the tool comprising: a sleeve through which the article can move axially during laying; and a grab handle for a grabber of a submersible vehicle.

Within the same inventive concept, the invention also resides in a submersible vehicle carrying a guide tool for subsea laying of an elongate article, the tool comprising a sleeve through which the article can slide axially during laying, wherein the sleeve can be opened to receive the article and can be closed around the article. For the purpose of opening and closing around the article, the sleeve suitably comprises a gate extending along its length.

Where the guide tool comprises a grab handle for a grabber of a submersible vehicle, the inventive concept also encompasses the combination of the guide tool and a submersible vehicle, when the guide tool is attached to the submersible vehicle via the grab handle.

The tool preferably further comprises a lock member movable between a locked position and an unlocked position, the lock member being cooperable with lock formations on the sleeve to lock the gate closed when in the locked position and to release the gate for opening when in the unlocked position.

The lock member may be carried by and movable with respect to the gate. Advantageously the gate is attached to a body of the sleeve by a hinge and the lock member is mounted to the gate at a location opposed to the hinge. Thus, force applied to move the lock member into the lock position may also act effectively to close the gate.

To ease actuation by a submersible vehicle such as an ROV, the lock member is preferably biased into the unlocked position. Similarly the lock member suitably includes a grab point to be grasped by a manipulator claw of the submersible vehicle.

For secure locking of the gate, the lock mechanism preferably further comprises a latch member cooperable with the lock member to hold the lock member in the locked position. The latch member may be movably mounted to the gate. For ease and effectiveness of operation, the latch member is preferably biased to engage the lock member in the locked position. In a preferred embodiment to be described, an element of the lock member is connected to the latch member for movement along a path, the path defining a latch position at which the latch member engages the lock member to hold the lock member in the locked position.

The inventive concept extends to a method of controlling subsea laying of an elongate article, comprising guiding the article using a submersible vehicle to apply guide forces to the article while the article moves relative to the submersible vehicle during laying, wherein the submersible vehicle carries a guide tool having a sleeve through which the article slides axially during laying, while the vehicle applies cross-axial guide forces to the article via the sleeve, and the method further comprises opening the sleeve to receive the article and then closing the sleeve around the article.

The method advantageously further comprises locking the sleeve closed by using the submersible vehicle to manipulate a lock mechanism on the guide tool.

The orientation of the sleeve with respect to the submersible vehicle may be varied to influence or to match the inclination and direction of the article in the region of the sleeve.

Preferably, movement of the submersible vehicle is automatically controlled along a lay path, for example by following a path pre-defined by waypoints. Also, movement of the submersible vehicle is advantageously coordinated with movement of an installation vessel from which the elongate article is launched. Thus, the submersible vehicle may be set to stay within a specified area relative to the installation vessel. Alternatively, the installation vessel may be set to stay within a specified area relative to the submersible vehicle.

The submersible vehicle may maintain a preordained water depth during the lay process, or a preordained height above the seabed.

Within the same inventive concept, the invention may also be expressed as a method of controlling subsea laying of an elongate article, the method comprising: monitoring the position of a submersible vehicle with respect to an installation vessel from which the elongate article is launched; guiding the installation vessel and the submersible vehicle in coordination; and guiding the article using the submersible vehicle to apply guide forces to the article while the article moves relative to the submersible vehicle during laying. Preferably, that method further comprises monitoring and controlling the position of the submersible vehicle with respect to the seabed and/or guiding the installation vessel in accordance with the position of the submersible vehicle.

Reference has already been made to FIGS. 1(a) and 1(b) of the accompanying drawings to describe the prior art. In order that the invention may be more readily understood, reference will now be made, by way of example, to the remaining drawings in which.

For brevity, the following description refers to laying an umbilical as an example of an elongate article apt to be handled by virtue of the invention. Of course, the invention may also be used with other elongate articles such as pipelines and power lines, whether flexible or rigid.

Figure 1:
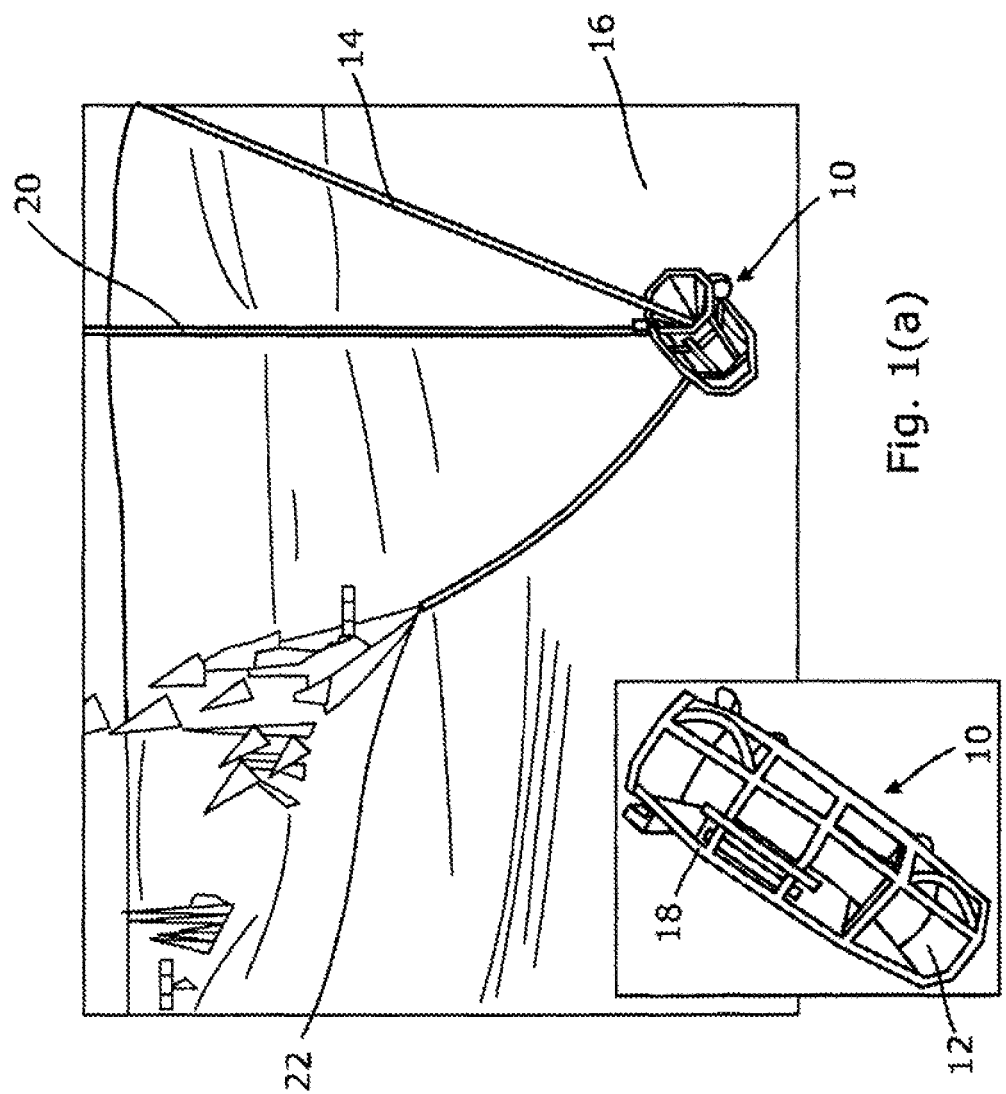
Figure 2:
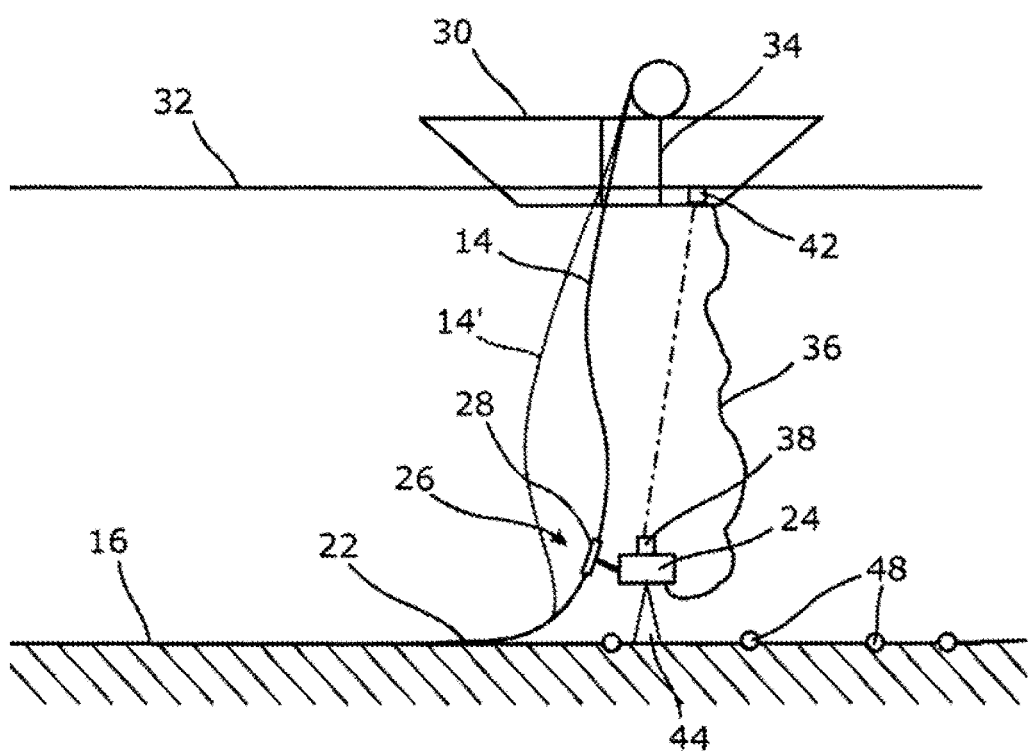
FIG. 2 is a schematic side view showing an ROV equipped with a guide tool in accordance with the invention, the ROV using the guide tool to control a catenary with reference to data from a Doppler velocity log, this figure also showing the beneficial effect of the invention in comparison with an unguided catenary.

Referring firstly to FIG. 2 of the drawings, an ROV 24 supports a guide tool 26 comprising a tubular sleeve 28 through which an umbilical 14 slides while being laid on the seabed 16. The umbilical 14 adopts a catenary shape during laying, the catenary extending between an Installation vessel 30 at the surface 32 that launches the umbilical 14 through a moon pool 34 and a touchdown point 22 where the umbilical 14 contacts the seabed 16.

A tether 36 extends from the installation vessel 30 to the ROV 24 for controlling the ROV 24 and for receiving feedback such as video signals from the ROV 24. Whilst an ROV pilot on the installation vessel 30 may fly the ROV 24 manually, it is preferred that there is a substantial element of automatic control of the ROV 24. It is also preferred that the movement of the ROV 24 and the installation vessel 30 are linked in a 'follow-ship' or 'follow-sub' mode as will be explained. The tether 36 may therefore carry data and signals necessary to achieve those objectives.

The guide tool 26 will be described in detail with reference to FIGS. 4 to 10 but FIG. 2 shows, schematically, that the sleeve 28 of the guide tool 26 is inclined at an angle corresponding to the local inclination of the umbilical 14. The guide tool 26 enables the ROV 24 to apply the required control forces to the umbilical 14 to maintain a desired catenary shape and to position the touchdown point 22 where required.

The angle of inclination and direction of the guide tool 26 may also be controlled to influence or to match the local inclination and direction of the catenary, thereby to control or to suit the local shape of the catenary.

In the example shown in FIG. 2, current running against the lay direction distorts the catenary slightly as shown, but without overbending or other problems by virtue of the compensating pull applied by the ROV 24 to the umbilical 14 via the guide tool 26. In this example the required pull force is less than 0.1 tonne (Te).

Some benefits of the invention are evident from the second umbilical 14' shown in dashed lines in FIG. 2, which is free to move in the current. That umbilical 14' would be pulled horizontally by the currant to the extent that the umbilical 14' would collide with the edge of the moon pool 34, risking damage, and would suffer from overbending near the touchdown point 22.

The guide tool 26 may be structurally mounted onto the ROV 24, for example on its front or rear, or may be adapted to be grabbed and manipulated by the ROV 24. It is envisaged that the former arrangement would best suit larger articles and that the latter arrangement would best suit smaller articles. The guide tool 26 may be provided with hydraulic, electrical and control services from the ROV 24. For example, the tool 26 may have hydraulic functions to enable the sleeve 28 to close around an elongate article such as an umbilical 14 and to set the correct lay angle, and to open automatically to release the article as a failsafe auto-release function to mitigate risk relating to, for instance, ROV blackout.

Thus, where the sleeve 28 is closed hydraulically, loss of hydraulic pressure from the ROV 24 may open the sleeve 28 to free the elongate article such as an umbilical 14 from the sleeve 28. The ROV 24 with an integrated guide tool 26 can then drift away from the article without damaging it. Alternatively, where the guide tool 26 is for smaller elongate articles and is arranged to be grabbed and manipulated by the ROV 24 to close the sleeve 28 mechanically, an ROV blackout will open the grabber of the ROV 24 and this will release the guide tool 26. In this instance, the guide tool 26 is preferably arranged to have slightly negative buoyancy so that if released by the ROV 24 when an elongate article is within the sleeve 28, the tool 26 will drift slowly down along the article without damaging either the article or the tool 26.

Cameras and lights may be fitted on the guide tool 26 or on the ROV 24 to monitor the umbilical 14 during the lay operation. Sensors may also be mounted on the guide tool 26 or on the ROV 24 to monitor the entry and exit lay angles if required. These features treat the umbilical 14 with greater care than existing simple 'dumb' depressor systems.

Figure 3:
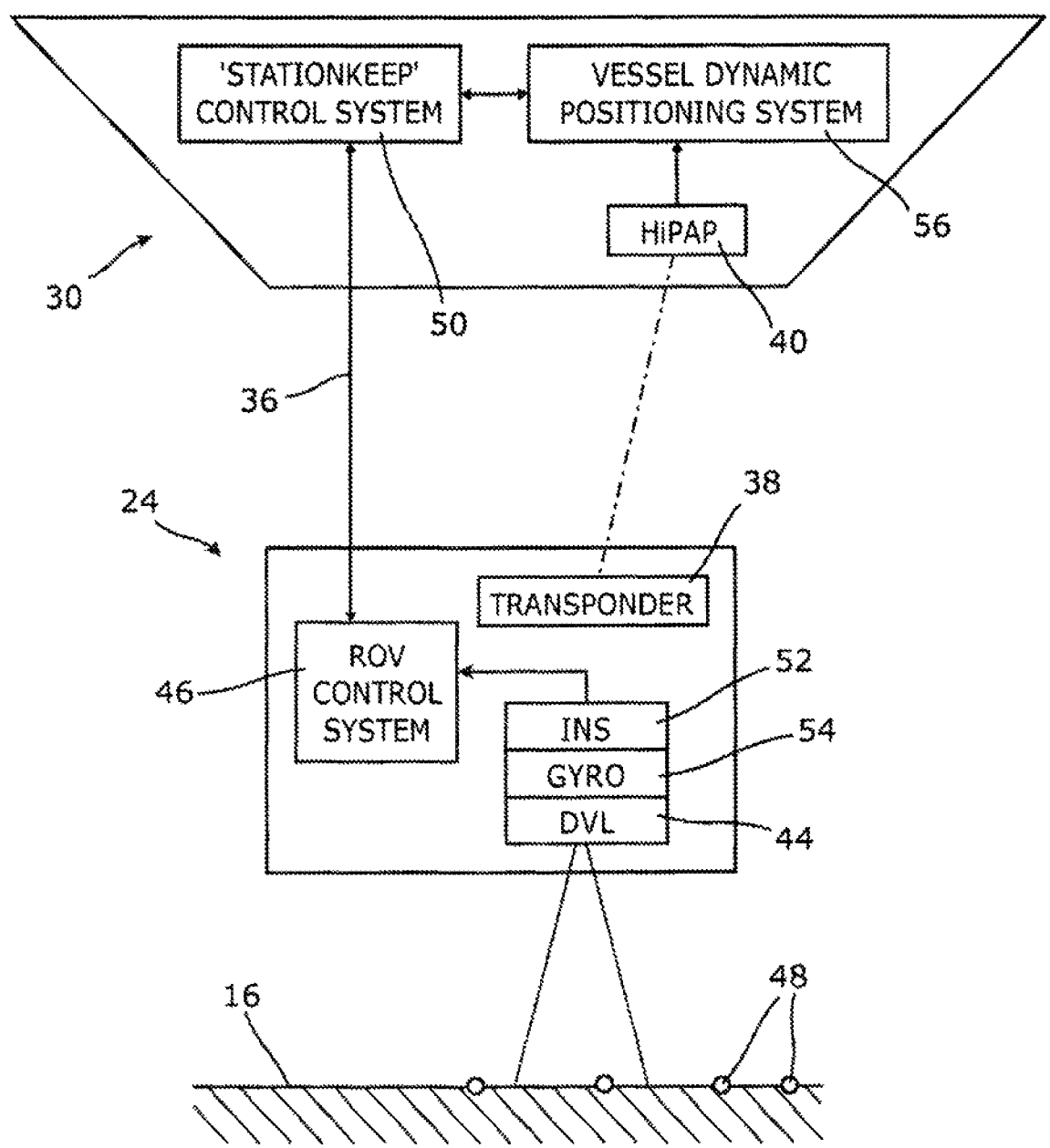
FIG. 3 is a block diagram showing the control system of the ROV and how it interacts with the dynamic positioning system of an installation vessel.

Referring now also to FIG. 3 of the drawings, the ROV 24 is fitted with a transponder beacon 38 whereby the relative position of the ROV 24 is known to the installation vessel 30. For this purpose, the installation vessel 30 is equipped with an acoustic underwater positioning system 40 that provides three-dimensional position data for the transponder beacon 38 relative to the vessel 30. A suitable acoustic underwater positioning system 40 is offered by Kongsberg Maritime under the acronym HiPAP, which stands for High Precision Acoustic Positioning. 'Kongsberg' and 'HiPAP' are acknowledged as trade marks of Kongsberg Maritime. A single multi-element transducer 42 on the installation vessel 30 receives the signals necessary for the acoustic underwater positioning system 40 to calculate the position of the transponder beacon 38 based on range and on vertical and horizontal angle measurements.

The ROV 24 is positioned close enough to the seabed 16 to control the position of the touchdown point 22 with the desired accuracy in response to, for example, the changing contours of the seabed 16 and changing current. To do so, the position and depth below the surface 32 or height above the seabed 16 of the ROV 24 and hence of the guide tool 26 are continuously controlled, using a Doppler velocity log (DVL) 44 to reference the seabed 16. The DVL 44 bounces sound waves off the seabed 16 as shown in dashed lines in FIG. 2 to determine the velocity vector of the ROV 24 with respect to the seabed 16, and this information is used to determine the position of the ROV 24 as will be explained in more detail below. The area within which the ROV 24 will have to position itself is approximately 5 m×5 m.

The normal lay operating method would be for an ROV pilot on the installation vessel 30, or on another ROV support vessel, to fly the ROV 24 manually along the lay mute whilst monitoring the lay through the guide tool 26. However it is possible, and preferred, for the movement of the ROV 24 along the lay route to be automated if suitably accurate positioning of the ROV 24 and the installation vessel 30 can be achieved. Specifically, enhanced positioning of the ROV 24 may be used to move the guide tool 26 automatically along the lay route to improve the lay accuracy while increasing the lay speed.

The control system 46 of the ROV 24 has auto-tracking software that enables surveyors to pre-program a path of waypoints 48 for the ROV 24 to follow. In this way, the lay route for the umbilical 14 may be pro-programmed using survey data so that the ROV 24 automatically moves along a route from one waypoint 48 to the next and helps to lay the umbilical 14 with a positional accuracy of, for example, 100 mm.

The ROV 24 may, for example, be an Acergy Core Vehicle or ACV, as offered by Acergy Group. The ACV system works with the StationKeep subsea dynamic positioning system 50 supplied by Schilling Robotics. 'Acergy'. 'StationKeep' and 'Schilling Robotics' are acknowledged as trade marks of their respective owners.

The StationKeep system 50 uses the DVL 44 of the ROV 24 to determine the velocity vector of the ROV 24 with respect to the seabed 16. The ROV 24 is also equipped with an inertial navigation system 52 and a gyro system 54 to give the required positional accuracy. Thus, the velocity information from the DVL 44 can be combined with a starting fix, compass heading and acceleration sensors to calculate the position, speed, orientation and heading of the ROV 24. On some ROV types, this merely involves some additional software programming as the required hardware is already in place.

Bottom track and altitude information provided by the DVL 44 are integrated into the ROV control system 48 to provide the ROV 24 with accurate positioning information relative to the seabed 16. The control system 46 of the ROV 24 uses this information, in addition to data provided by the onboard inertial navigation system 52 and gyro system 54, to offer the automatic operation mode known as Station-Keep. When this mode is selected, the ROV 24 automatically assumes flight control and maintains position in the X, Y, and Z axes. In doing so, the ROV 24 reacts automatically to external forces, such as current, to maintain position. Heading, altitude, and position are all maintained automatically.

The control system 46 of the ROV 24 must work together with the main dynamic positioning (DP) system 56 of the installation vessel 30 laying the umbilical 16. The ROV 24 may be set to stay within a specified area relative to the installation vessel 30 ('follow-ship' mode) or, conversely, the OP system 56 of the installation vessel 30 may be set to stay within a specified area relative to the ROV 24 ('follow-sub' mode). The latter option is preferred, with the DP system 56 of the installation vessel 30 being set in follow-sub mode so that the vessel 30 will follow the ROV 24 as the ROV 24 flies along its route. Instead of trying to control the lay from the vessel 30, this technique controls the lay locally at the seabed 16. The OP system 56 does this by referencing off the transponder beacon 38 carried by the ROV 24 to track the range and direction of the ROV 24 relative to the installation vessel 30 and then ensuring that the vessel 30 stays within a defined radius and bearing relative to the ROV 24. Thus, when the OP system 56 of the installation vessel 30 is programmed to operate in 'follow-sub' mode, the entire lay operation may be automated.

An 'auto-depth' function of the ROV 24 is preferably also used. In this way, the ROV 24 follows (or controls) the position of the installation vessel 30 automatically on a specified water depth while keeping the catenary within its installation limits.

Referring now to FIGS. 4 to 9, these figures show the guide tool 26 in detail but for clarity, they omit accessories such as cameras, lights or sensors. The guide tool 26 shown in those figures is merely an example: the size, shape and specific features of the guide tool 26 must be selected in accordance with the required criteria for the elongate article being handled and also what suits the ROV 24. Ideally, the guide tool 26 should be designed to handle various types and sizes of elongate articles.

Figure 10:
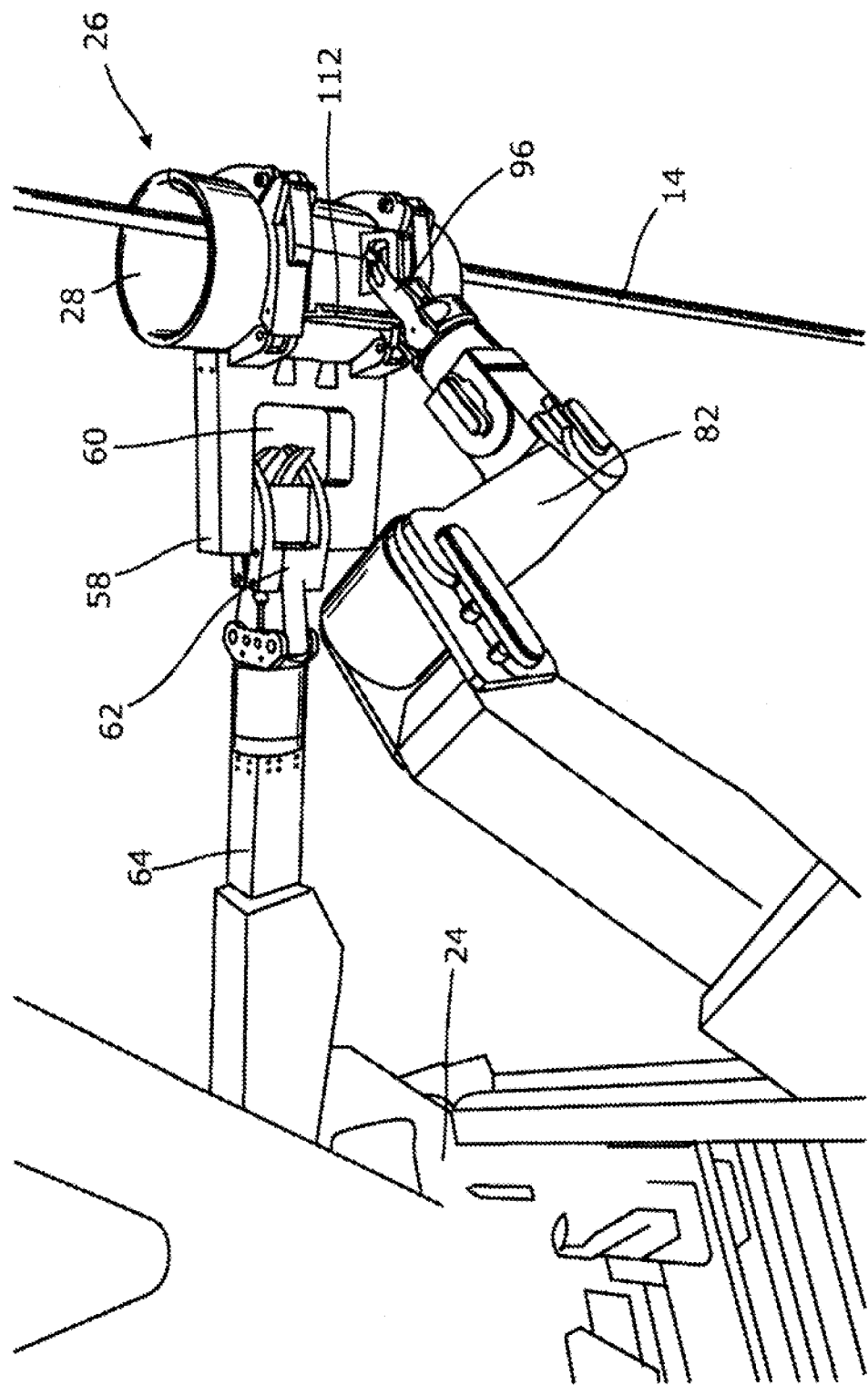
FIG. 10 is a perspective view showing a variant of the guide tool in use with its sleeve closed around an umbilical while being supported by the grabber of an ROV, having just been locked by a manipulator of the ROV.

A guide tool can be structurally mounted onto the ROV 24 as mentioned above but the guide tool 26 shown in this example is adapted to be grabbed and manipulated by the ROV 24. FIG. 10 shows a minor variant of the guide tool 26 in use with its sleeve 28 closed around an umbilical 14 while being supported by the grabber arm 64 of an ROV 24, having just been locked using a manipulator arm 82 of the ROV 24.

The sleeve 28 of the guide tool 26 is tubular, elongate and of circular transverse cross-section, being rotationally symmetrical about a central longitudinal axis. A manipulator grab point is spaced from the sleeve 28 to be grabbed by a gripper 62 of a grabber arm 64 of the ROV 24 as shown in FIG. 10. The grab point is defined by an oblong ROV handle 58 that projects from the sleeve 28 in a plane parallel to the central longitudinal axis of the sleeve 28. The ROV handle 58 has a central opening 60 to accommodate the fingers of a four-finger intermeshing gripper 62 of the grabber arm 64. In this way, the grabber arm 64 locates the guide tool 26 relative to the ROV 24 and determines its orientation relative to the ROV 24.

Figure 4:
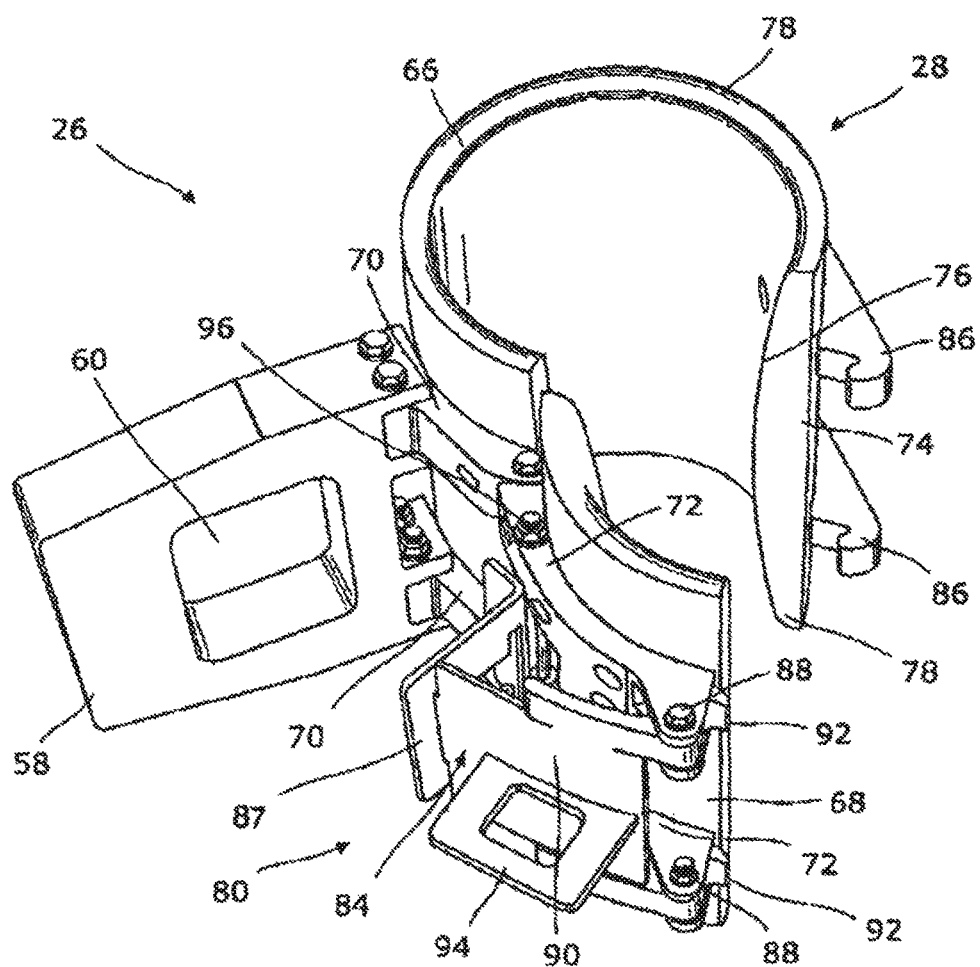
FIG. 4 is a perspective view of a guide tool with its sleeve open ready to receiving an elongate article such as an umbilical.
Figure 5:
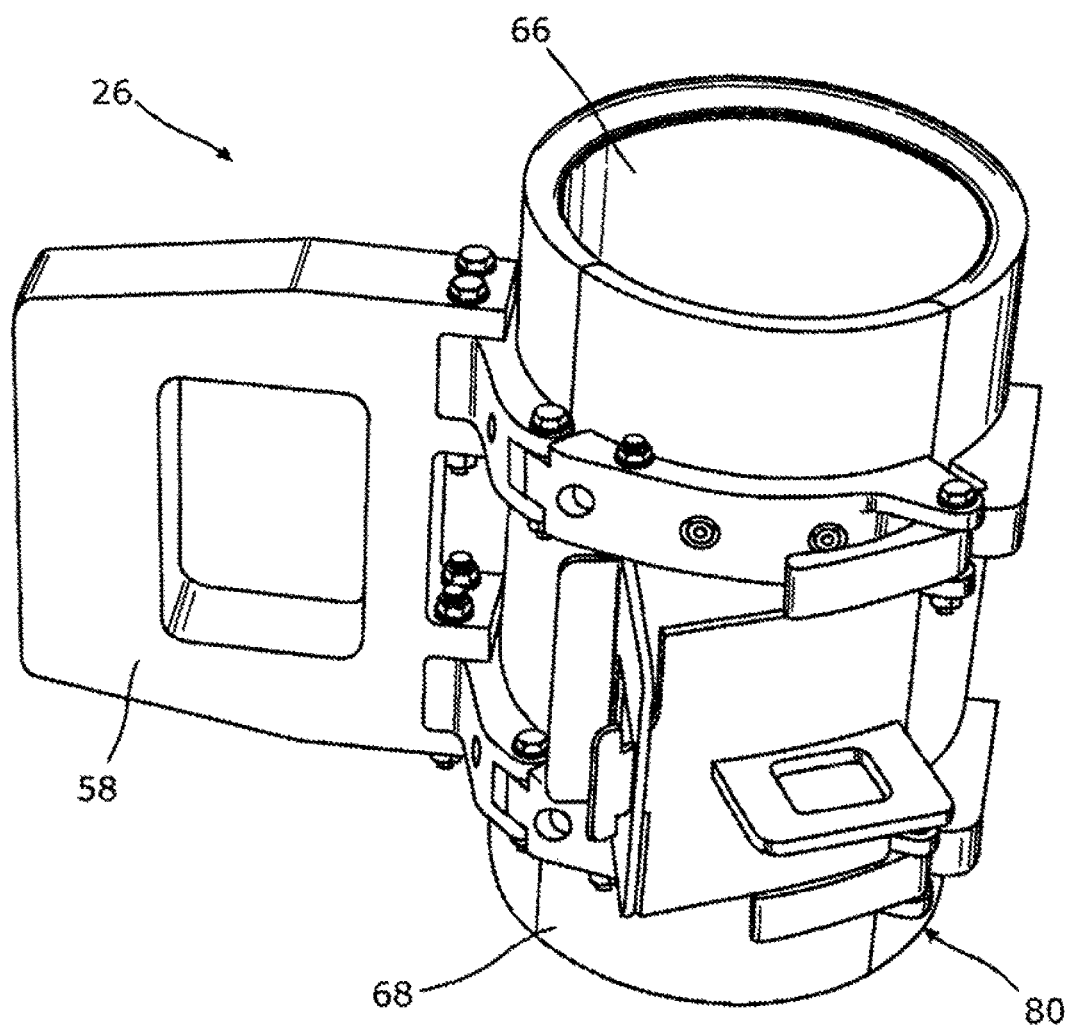
FIG. 5 is a perspective view of the guide tool of FIG. 4 and with its sleeve closed but not yet locked.
Figure 6:
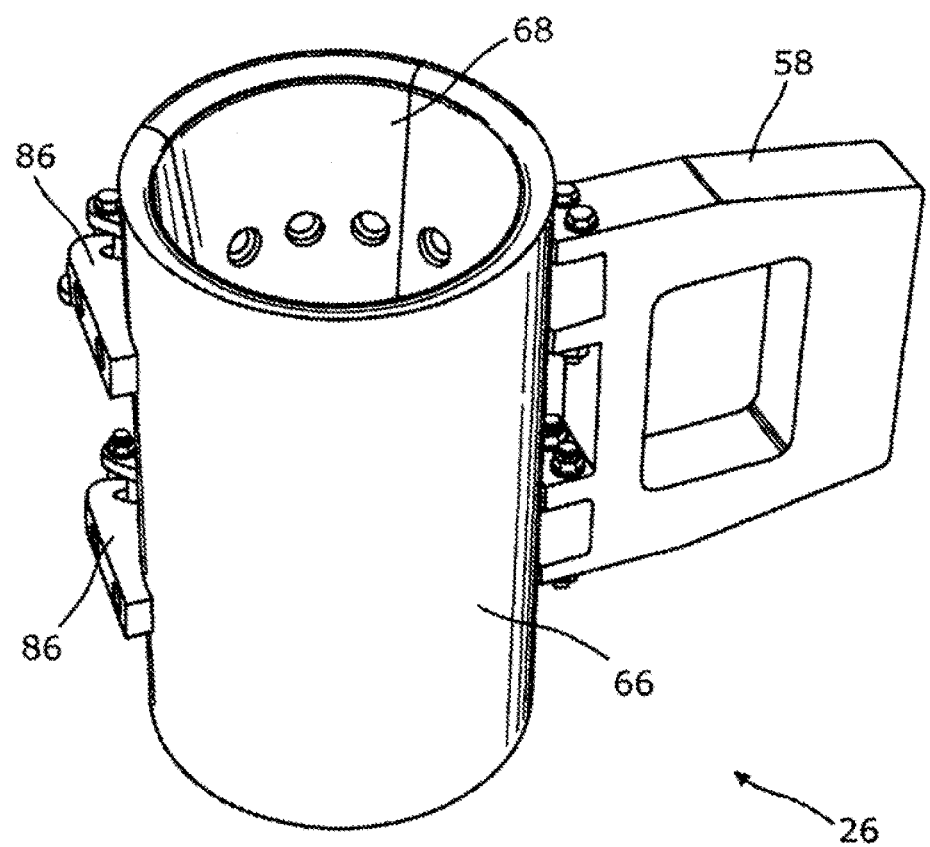
FIG. 6 is a perspective view corresponding to FIG. 5 but showing the other side of the guide tool.

As best shown in FIG. 4, the circumference of the sleeve 28 is split longitudinally from one end of the sleeve 28 to the other by radial slits to define a C-section body 66 and a gate 68 hinged to the body 66. The body 66 occupies a majority of the circumference of the sleeve 28, in a ratio of approximately 3:1 relative to the gate: thus, the body 66 accounts for approximately three quarters of the circumference of the sleeve 28 versus one-quarter for the gate 68, which therefore occupies approximately 90° of arc.

The body 66 of the sleeve 28 carries longitudinally-spaced hinge forks 70 that are bolted to the body 66. The hinge forks 70 bear loads from the ROV handle 58 and cooperate with respective longitudinally-spaced hinge elements 72 that are bolted to the gate 68 and so attach the gate 68 to the body 66 via the hinge forks 70. The gate 68 is thereby hinged to the body 66 on a hinge axis parallel to the central longitudinal axis of the sleeve 28. The gate 68 is shown open in FIG. 4 to admit the umbilical 14 into the sleeve 28 and closed in FIGS. 5 to 9 to enclose the umbilical 14 within the sleeve 28, although the umbilical 14 is not shown in those figures.

The tubular wall of the sleeve 28 has sides that are largely parallel to the longitudinal axis but are thicker centrally than at the ends of the sleeve 28. Specifically, the lens-like longitudinal cross-section of the wall comprises a straight-sided cylindrical external surface 74 and a convex-curved internal surface 76 that curves continuously from one end of the sleeve 28 to the other, curving slightly outwardly from the centre toward the ends of the sleeve 28. Thus, the internal diameter of the sleeve 28 is at a minimum centrally between the opposed ends of the sleeve 28 and at a maximum at the ends of the sleeve 28. The internal surface 76 terminates in rounded edges 78 at the ends of the sleeve 28. These curved shape features of the sleeve 28 are best appreciated in FIG. 4. They support, and avoid damage to, the umbilical 14 as it slides within the sleeve 28.

The guide tool 26 further comprises a lock mechanism 80 for locking the gate 68 closed to enclose the umbilical 14 within the sleeve 28. The lock mechanism 80 is designed for operation by a manipulator arm 82 of the ROV 24 as shown in FIG. 10 and is arranged to keep the gate 68 locked in the closed position while the manipulator arm 82 is made available for other tasks. The lock mechanism 80 is also designed to open automatically when released by the manipulator arm 82 of the ROV 24.

Briefly, the lock mechanism 80 comprises: a lock member 84 on the gate 68 that is movable between unlocked and locked positions; lock formations 86 bolted to the body 66 that are co-operable with the lock member 84 to lock the gate 68 closed when the lock member 84 is moved to the locked position; and a movable latch member 87 that holds the lock member 84 in the locked position until the latch member 68 is moved to release the lock member 84 when opening the gate 68.

More specifically, the lock member 84 is attached to the gate 68 by pivots 88 near the free edge of the gate 68, opposed to the hinge forks 70. The pivots 88 lie on a pivot axis that is parallel to the central longitudinal axis of the sleeve 28. The lock member 84 is generally of L-section, comprising a plate 90 and pawls 92 opposed about the pivots 88, so that the pawls 92 protrude slightly in a crank action when the plate 90 of the lock member 84 is pushed inwardly toward the gate 66 into the locked position. The lock member 84 is biased into the unlocked position by a compressible spring ring (not shown) acting between the plate 90 and the gate 68.

A claw grab point 94 is provided on the plate 90 of the lock member 84 to be grasped by a claw 96 of the manipulator arm 82 of the ROV 24 as shown in FIG. 10. The lock formations 86 are longitudinally spaced on the body 66 adjacent the gate 68, opposed to the hinge forks 70, where each formation 86 aligns with a respective one of the pawls 92. When the plate 90 of the lock member 84 is moved into the locked position by being pushed inwardly against spring bias toward the gate 68 when the gate 68 is closed, the lock member 84 pivots so that the pawls 92 of the lock member 84 engage under the lock formations 86 on the body 66 to hold the gate 68 closed.

Figure 7:
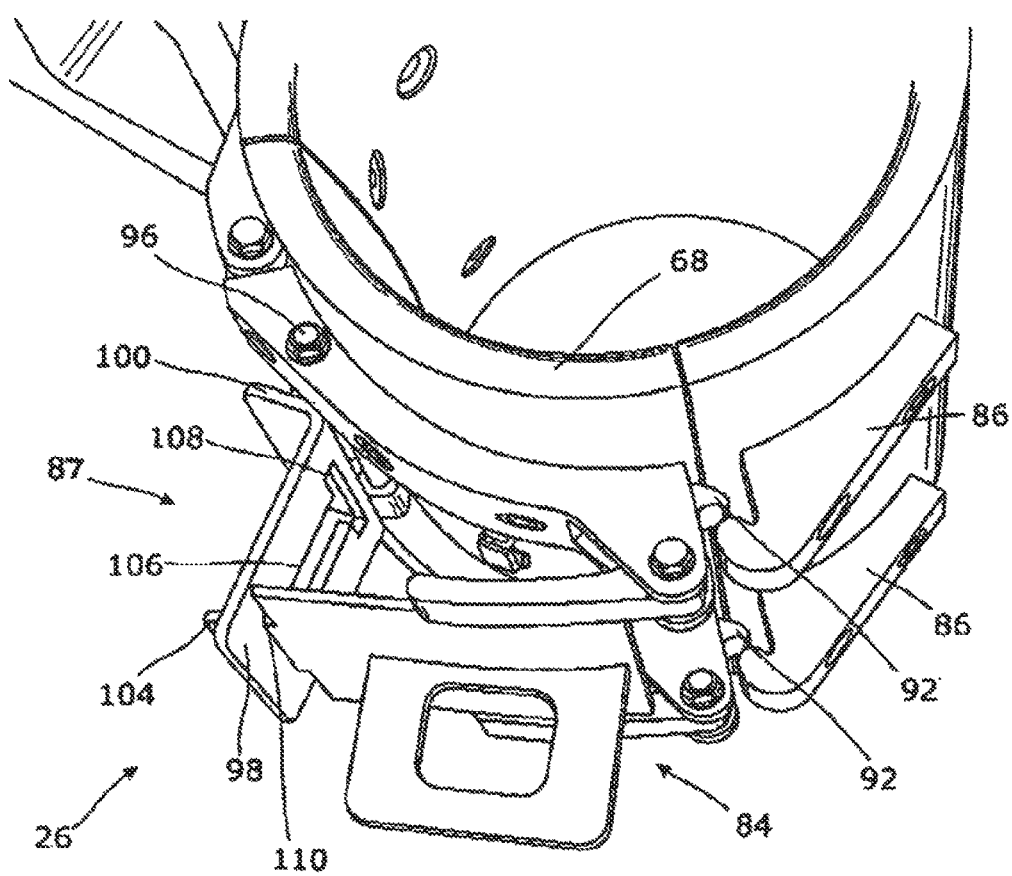
FIG. 7 is an enlarged perspective view of the guide tool of FIGS. 4 to 6 showing details of its lock mechanism with its sleeve closed but not yet locked.
Figure 8:
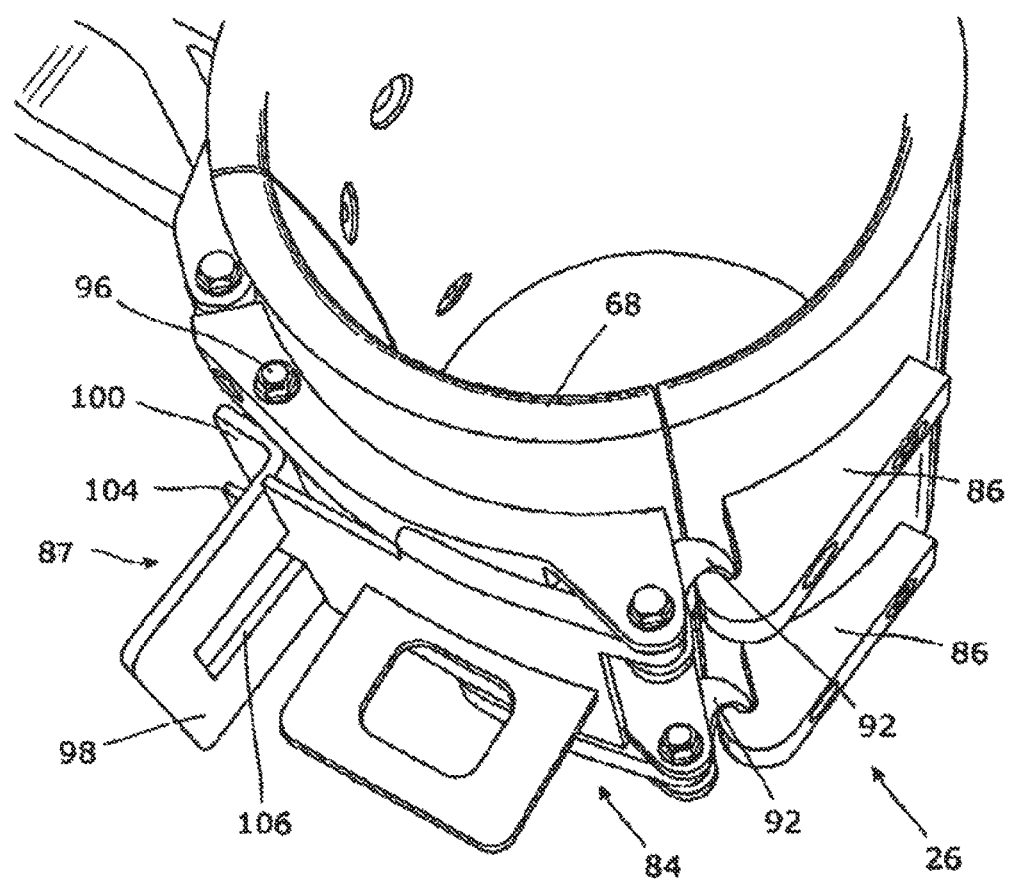
FIG. 8 is an enlarged perspective view corresponding to FIG. 7 but showing the lock mechanism when locked.
Figure 9:
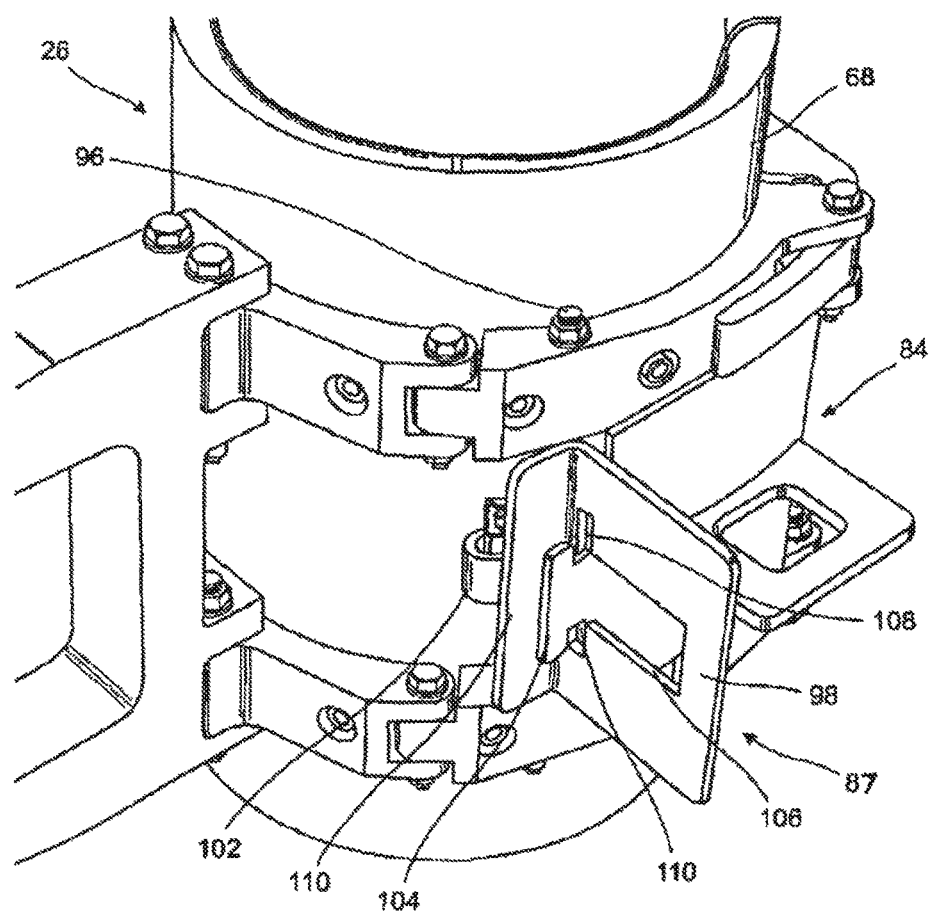
FIG. 9 is a perspective view of the guide tool of FIGS. 4 to 8 with its sleeve closed and locked.

The latch member 87 is attached to the hinge elements 72 by a pivot 96 whose axis is parallel to the central longitudinal axis of the sleeve 28. As best shown in FIGS. 7, 8 and 9, the latch member 87 is generally of L-section, comprising a plate 98 and a foot 100 opposed about the pivot 96. The plate 98 of the latch member 87 is biased toward the lock member 84 by a compressible spring ring 102 (visible in FIG. 9) acting between the foot 100 of the latch member 87 and the gate 68.

The lock member 84 and the latch member 87 are interconnected to move in unison as the lock member 84 moves between the locked and unlocked positions. Specifically, the plate 90 of the lock member 84 terminates in a T-shaped projection 104 that is received in a T-shaped slot 106 in the plate 98 of the latch member 87. The projection 104 slides along the slot 106 as the lock member 84 moves between the unlocked and locked positions.

When the lock member 84 reaches the locked position, the projection 104 reaches the inner end of the slot 106 where the head 108 of the T-shaped slot 106 is located. Then, under the bias of the spring ring 102, the latch member 87 snaps toward the lock member 84 as a shoulder formation 110 at the base of the projection 104 engages with the head 108 of the slot 106. The bias of the spring ring 102 keeps the shoulder formation 110 engaged with the head 108 of the slot 106 and so keeps the lock member 84 latched in the locked position.

To open the gate 68 so as to release the guide tool 26 from the umbilical 14 by freeing the umbilical 14 from the sleeve 28, the lock member 84 is released from the locked position by flicking the latch member 87 sideways away from the lock member 84 against the bias of the spring ring 102, using the claw 96 of the manipulator arm 82 of the ROV 24. This disengages the shoulder formation 110 from the head 108 of the slot 106. The spring ring (not shown) acting between the plate 90 of the lock member 84 and the gate 68 pushes the lock member 84 out of the locked position into the unlocked position, which disengages the pawls 92 of the lock member 84 from the lock formations 86 to unlock the gate 68. The claw 96 of the manipulator arm 82 then grips the claw grab point 94 on the plate 90 of the lock member 84 to open the gate 68.

As noted above, the guide tool 26 shown in FIG. 10 of the drawings is a minor variant of the guide tool 26 shown in FIGS. 4 to 9. In the variant shown in FIG. 10, a flange 112 extends across the latch member, facing the lock member. The free end of the plate of the lock member engages under the flange 112 of the latch member to hold the lock member in the locked position.

As mentioned previously, the guide tool 26 illustrated in FIGS. 4 to 10 is preferably arranged to have slightly negative buoyancy in sea water. For example, a weight of approximately 20 kg in air may translate to approximately 0.1 kg in sea water. For this purpose, the guide tool 26 is constructed predominantly of plastics material, with the sleeve 28, the ROV handle 58, the hinge forks 70 and the hinge elements 72 suitably being of high-density polyethylene such as PEHD 1000. Most other parts of the guide tool 26 such as the components of the lock mechanism 80 are suitably of aluminium alloy such as Al 6082-T6.

By virtue of the invention, all of the abovementioned problems of the prior art may be solved or mitigated. There is also a potential to make installation of many pipelines and umbilicals much more effective by:
  making it easier to lay within the given tolerances at a faster lay speed;
  allowing installation in higher sea states;
  allowing installation in faster currents;
  avoiding the use of a depressor;
  avoiding the use of deployment wires; and
  actively controlling the position and orientation of the guide tool.

The invention claimed is:

1. A guide tool suitable for subsea laying of an elongate article when used by a submersible vehicle, the tool comprising:
  a sleeve through which the article can slide axially during laying; and
  a grab handle for a grabber of a submersible vehicle.

2. The tool of claim 1, wherein the sleeve comprises a gate extending along its length.

3. The tool of claim 2 further comprising a lock member movable between a locked position and an unlocked position, the lock member being cooperable with lock formations on the sleeve to lock the gate closed when in the locked position and to release the gate for opening when in the unlocked position.

4. The tool of claim 3, wherein the lock member is carried by and movable with respect to the gate.

5. The tool of claim 3, wherein the gate is attached to a body of the sleeve by a hinge and the lock member is mounted to the gate at a location opposed to the hinge.

6. The tool of claim 3, wherein force applied to move the lock member into the lock position also acts to close the gate.

7. The tool of claim 3, wherein the lock member is biased into the unlocked position.

8. The tool of claim 3, wherein the lock member includes a grab point to be grasped by a manipulator claw of the submersible vehicle.

9. The tool of claim 3, wherein the lock mechanism further comprises a latch member cooperable with the lock member to hold the lock member in the locked position.

10. The tool of claim 9, wherein the latch member is biased to engage the lock member in the locked position.

11. The tool of claim 9, wherein an element of the lock member is connected to the latch member for movement along a path, the path defining a latch position at which the latch member engages the lock member to hold the lock member in the locked position.

12. The tool of claim 9, wherein the latch member is movably mounted to the gate.

13. A submersible vehicle carrying a guide tool suitable for subsea laying of an elongate article, the guide tool comprising a grab handle for a grabber of the submersible vehicle and a sleeve through which the article can slide axially during laying; characterized in that the sleeve can be opened to receive the article and can be closed around the article, and in that the guide tool is attached to the submersible vehicle via the grab handle.

14. The submersible vehicle of claim 13, wherein the sleeve comprises a gate extending along its length.

15. The submersible vehicle of claim 14 further comprising a lock member movable between a locked position and an unlocked position, the lock member being cooperable with lock formations on the sleeve to lock the gate closed when in the locked position and to release the gate for opening when in the unlocked position.

16. The submersible vehicle of claim 15, wherein the lock member is carried by and movable with respect to the gate.

17. The submersible vehicle of claim 15, wherein the gate is attached to a body of the sleeve by a hinge and the lock member is mounted to the gate at a location opposed to the hinge.

18. The submersible vehicle of claim 15, wherein force applied to move the lock member into the lock position also acts to close the gate.

19. The submersible vehicle of claim 15, wherein the lock member is biased into the unlocked position.

20. The submersible vehicle of claim 15, wherein the lock member includes a grab point to be grasped by a manipulator claw of the submersible vehicle.

21. The submersible vehicle of claim 15, wherein the lock mechanism further comprises a latch member cooperable with the lock member to hold the lock member in the locked position.

22. The submersible vehicle of claim 21, wherein the latch member is biased to engage the lock member in the locked position.

23. The submersible vehicle of claim 21, wherein an element of the lock member is connected to the latch member for movement along a path, the path defining a latch position at which the latch member engages the lock member to hold the lock member in the locked position.

24. The submersible vehicle of claim 21, wherein the latch member is movably mounted to the gate.

* * * * *